3,703,496
HYDROLYTIC STABILIZER OF PHOSPHITE ESTERS AND USE AS EPOXY RESIN STABILIZER

James J. Hodan, Williamsville, and William L. Schall, Buffalo, N.Y., assignors to Hooker Chemical Corporation, Niagara Falls, N.Y.
No Drawing. Original application Oct. 20, 1967, Ser. No. 676,709, now Patent No. 3,553,298. Divided and this application Aug. 3, 1970, Ser. No. 67,655
Int. Cl. C08g 30/14
U.S. Cl. 260—47 EC
11 Claims

ABSTRACT OF THE DISCLOSURE

This invention is directed to a novel phosphite ester composition containing particular nitrogen-containing compounds which stabilizes the phosphite ester against hydrolysis and remains in solution, relates to novel epoxy resin compositions containing the stabilized phosphite ester composition, and relates to the stabilizing use.

---

The nitrogen-containing compound of this invention which stabilize phosphite esters against hydrolysis and which do not precipitate from a stabilized phosphite ester composition thereof, is a member selected from the group consisting of (1) a heterocyclic alkyl such as typically piperidine, pyrrolidine, piperazine, diketopiperazine, pipecoline, anthraquinoline, thiazole, thiothrazoin, oxazolidine, isoxazolidine, and oxdiazole, (2) an aromatic heterocyclic such as typically oxazoline, isoxazoline, thiotriazole, pyridine, picoline, pyrrole, and quinoline, (3) a dialkanol amine such as typically diisopropanol amine, diethanol amine, tetraethanol ethylene diamine, and tetraisopropanol ethylene diamine, (4) a trialkanol amine such as typically triisopropanol amine, and triethanol amine, (5) ammonia, and (6) an alkyl amine such as triethyl amine, dimethyl amine, and tripropyl amine, provided that heterocyclic atoms of said heterocyclic alkyl and of said aromatic heterocyclic typically include nitrogen, oxygen, and sulfur, and provided that at least one nitrogen atom is included. The substituted forms of each of the above members are also within the scope of the invention. Typical substituents are alkyl, aryl, various halogen substituents, oxygen, sulfur-containing and the like, provided that the particular substituent does not adversely affect the properties of the stabilized phosphite of this invention. Typical substituents include methyl, ethyl, propyl, decyl, methoxy, propoxy, chlorine, oxy, hydroxy, carboxy, sulfoxy, nitroxy, phenyl, naphthyl, and the like.

This is a division of our parent application, Ser. No. 676,709, filed Oct. 20, 1967 and now U.S. Pat. 3,553,298.

This invention is directed to a novel phosphite ester composition containing particular nitrogen-containing compounds which stabilizes the phosphite ester against hydrolysis and remains in solution, relates to novel epoxy resin compositions containing the stabilized phosphite ester composition, and relates to the stabilizing use.

BACKGROUND

Phosphite esters hydrolyze in the presence of moisture and this produces phosphite esters which have undesirable properties for certain applications where such compounds are employed.

Moreover, when an epoxide resin composition containing a phosphite ester is exposed to the air, particularly moist air for extended periods of time, a thick resinified skin develops on the surface which makes it difficult to pour the mixture from its container. One of the stabilizers currently commercially employed to stabilize phosphite esters against hydrolysis is magnesium oxide, and related compounds. A major problem exists, however, in the practical use of these type stabilizers because of the marked tendency of the magnesium oxide to precipitate out of the stabilized phosphite ester solution if the stabilized composition is prepared in any substantial length of time prior to use. To avoid the problem, it has been necessary for the manufacturers to incorporate stabilizer immediately prior to use of the phosphite esters; such a procedure causes other difficulties as well as being inconvenient and costly to the epoxy resin manufacturers. Accordingly, a phosphite ester stabilizer, and the resulting stabilized composition which is not subject to precipitation of the stabilizer is highly desirable for commercial use by the manufacturers of epoxy resins who incorporate phosphite esters therein.

An object of this invention is a novel use of particular compounds as stabilizers against hydrolysis of phosphite esters.

Another object is a novel phosphite ester composition stabilized against hydrolysis.

Another object is an epoxy resin including a novel phosphite ester composition stabilized against hydrolysis.

Another object is a stabilized phosphite ester composition from which the stabilizer does not readily precipitate therefrom upon standing.

Other objects became apparent from the preceding and following disclosure.

THE INVENTION

In accordance with this invention, it has been found that when a nitrogen-containing compound of this invention (hereinafter defined) is mixed with a neutral ester of a phosphorous acid (herein referred to for convenience as a phosphite ester), the phosphite ester has improved hydrolytic stability. When such a mixture is admixed with an epoxide resin, surprising improvements in the stability of the epoxide resin composition result.

The nitrogen-containing compound of this invention which stabilize phosphite esters against hydrolysis and which do not precipitate from a stabilized phosphite ester composition thereof, is a member selected from the group consisting of (1) a heterocyclic alkyl such as typically piperidine, pyrrolidine, piperazine, diketopiperazine, pipecoline, anthraquinoline, N-methyl pyrrolidine, thiazole, oxazolidine, isooxazolidine, and oxdiazole, (2) an aromatic heterocyclic such as typically oxazoline, isoxazoline, thiotriazole, pyridine, picoline, pyrrole, and quinoline, (3) a dialkanol amine such as typically diisopropanol amine, diethanol amine, tetraethanol ethylene diamine, and tetraisopropanol ethylene diamine, (4) a trialkanol amine such as typically triisopropanol amine, and triethanol amine, (5) ammonia, and (6) an alkyl amine such as triethyl amine, diamethyl amine, and tripropyl amine, provided that heterocyclic atoms of said heterocyclic alkyl and of said aromatic heterocyclic typically include nitrogen, oxygen, and sulfur, and provided that at least one nitrogen atom is included. The substituted forms of each of the above members are also within the scope of the invention. Typical substituents are alkyl, aryl, various halogen substituents, oxygen, sulfur-containing, and the like, provided that the particular substituent does not adversely affect the properties of the stabilized phosphite of this invention. Typical substituents include methyl, ethyl, propyl, decyl, methoxy, propoxy, chlorine, oxy, hydroxy, carboxy, sulfoxy, nitroxy, phenyl, naphthyl, and the like. The length of alkyl or alkynol chain, for example, is important solely in that the short-chain alkyls or alkylnols of about 1 to about 6 carbons gives the preferred solubility of the stabilizer of this invention whereby the stabilizer does not precipitate from the stabilized phosphite ester solution. Although methyl and methanol amines are otherwise satisfactory, these compounds are not desirable because of their high volatility. It is noteworthy that the specificity of the non-precipitating stabilizers (i.e., those which are highly effective and which do not precipitate from the stabilized phosphite ester solution) is further emphasized by the fact that monoethanolamine is much less effective as a stabilizer as compared to other compounds of this invention, although the monoethanol amine does have stabilizing action.

The stabilizer of this invention is normally employed in from about 0.01% to about 5% by weight of the phosphite ester, preferably from about 0.2% to about 1%. Use in larger than 2% merely serves to increase cost, and also may tend to adversely affect epoxy resin properties if used in excessive amounts. Sepcifically, it has been observed that when used in excess of about 5%, there is a significant increase in the production of free phenol, which would suggest the probability that a transesterification reaction begin at a threshold of above about 5% of the stabilizer, based on the weight of the phosphite ester. A preferred result is obtained in the employment of triisopropanol amine to produce a stabilized triphenyl phosphite.

Although in order to facilitate the dissolving of the stabilizer in the phosphite ester to form a solution thereof, it is preferred to admix the normally solid stabilizers in the form of a melt, it is possible to bring about the solution by any convenient and/or conventional means, such as merely admixing the stabilizer with triphenyl phosphite.

By the term "a neutral ester of a phosphorous acid" is meant esters of a phosphorous acid having three divalent chalkogen (i.e. oxygen, sulfur, selenium or tellurium) atoms attached to the phosphorus atom, at least two of the divalent chalkogen atoms also being attached to the same organic radical or to separate radicals and which may be like or unlike, any remaining chalkogen radical being attached to a hydrogen atom, e.g. phosphites, phosphothioites, phosphorodithioites, phosphorotrithioites, hydrogen phosphites, di- or polyphosphites, etc. The term "neutral" is used in its ordinary sense since such esters, including the dialkyl and diaryl esters, do not form salts or bases.

Phosphite esters having the following structure

wherein X is a divalent chalkogen atom having an atomic weight of less than 35, i.e. oxygen or sulfur and $R_1$ and $R_2$ are like or unlike organic radicals, e.g. aromatic, aliphatic, alicyclic radicals and $R_3$ is hydrogen or an organic radical represent a preferred class of phosphite esters which are contemplated within the broad scope of this invention. For example, the aromatic radicals may be aryl radicals such as phenyl, tolyl, ethylphenyl, nonylphenyl, decylphenyl, 2,4-dibutylphenyl, 2-methyl-3-ethylphenyl, cyml, xenyl, naphthyl, and the like or aralkyl radicals such as benzyl, phenylethyl, phenylpropyl, phenylheptyl, and the like; the aliphatic radicals may be alkyl radicals such as methyl, ethyl, isopropyl, butyl, isoamyl, hexyl, heptyl, 2-ethylhexyl, nonyl, isodecyl, dodecyl, and the like, or alkenyl radicals such as allyl, propenyl, butenyl, pentenyl, and the like; or alkynyl radicals such as propynyl, butynyl, pentynyl and the like; the alicyclic radicals may be cycloalkyl radicals such as cyclopentyl, cyclohexyl, cycloheptyl, or cycloalkenyl radicals such as cyclopentyl, cyclohexenyl, cycloheptenyl, and the like; etc.

The aforementioned radicals may also be substituted by one or more substituents. Typical, but not limitative of such substituents are the halogens, such as chlorine, bromine, iodine and fluorine; alkoxy groups such as methoxy, ethoxy, propoxy, butoxy, ethoxybutoxy, etc.; one or more hydroxy groups, etc.

It is preferred that the divalent X radical in the above formula be an oxygen atom and that the $R_1$, $R_2$ and $R_3$ radicals each be an aryl hydrocarbon radical containing from 6 to 15 carbon atoms. Triphenyl phosphite is particularly preferred.

As exemplary of other classes of phosphite esters included within the scope of the term "a neutral ester of a phosphorous acid" there may be mentioned the cyclic organic phosphites, such as those obtained by the reaction of an arylene dichlorophosphite with a glycol having adjacent hydroxyl groups, these compounds and the preparation thereof are more completely described in U.S. 2,839,563; also the cyclic organic phosphites obtained by the reaction of a diol with a triaryl phosphite, said process being more completely described in U.S. 2,834,798; alkanolamine phosphites as are obtained by the partial transesterification of a tertiary aromatic phosphite, said process being more completely described in U.S. 2,841,607; tetraaromatic alkylene phosphites obtained by the reaction of 2 mols of an appropriate secondary aromatic monochlorophosphite with a vicinal glycol in the presence of two mols of a tertiary base, e.g. see U.S. 2,841,606; a pentaerythritol phosphite derivative as is described in U.S. 2,847,443; etc.

The phosphite esters contemplated by the term "a neutral ester of a phosphorous acid," are for the most part obtained by the reaction of an appropriate hydroxy or thiol compound with phosphorous trihalide in the presence or absence of a hydrogen halide acceptor.

Ethoxyline, epoxy or epoxide resins, as they are variously called, are well known to those skilled in the art. The epoxide resins useful in compositions and methods of this invention are those resinous organic compounds containing at least one epoxy group, i.e.

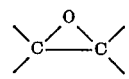

These compounds may be saturated or unsaturated, aliphatic, cycloaliphatic, aromatic, or heterocyclic and may contain substituents such as halogen atoms, OH groups, ether radicals and the like.

Generally, such epoxide resins comprise a polyether derivative of a polyhydric organic compound, said derivative containing 1,2-epoxy groups and said compound being selected from the group consisting of polyhydric alcohols and phenols containing at least two phenolic hydroxy groups. Such resins are commonly referred to as glycidyl polyethers.

Among the polyhydric phenols which may be used in preparing such glycidyl polyethers are the mononuclear phenols such as resorcinol, catechol, hydroquinone, etc. and the polynuclear phenols, such as bis(4-hydroxyphenol)-2,2-propane, 4,4'-dihydroxybenzophenone, bis(4-hydroxyphenyl)-1,1-ethane, bis(4-hydroxyphenyl)-1,1-isobutane, bis(4-hydroxyphenyl)-2,2-butane, bis(4-hydroxy-2-methylphenyl)-2,2-propane, bis(4-hydroxy-2 - tertiary butylphenyl)-2,2-propane, bis(4-hydroxy - 2,5 - dichlorophenyl)-2,2-propane, 4,4'-dihydroxybiphenyl, 4,4'-dihydroxypentachlorobiphenyl, bis(2-hydroxynaphthyl) - methane, 1,5-dihydroxy naphthalene, phloroglucinol, 1,4-dihydroxynaphthalene, 1,4-bis(4-hydroxyphenyl) cyclohexane, etc. as well as other complex polyhydric phenols such as pyrogallol, phloroglucinol and novolac resins froms the condensation of a phenol with an aldehyde in the presence of an acidic condensation catalyst. For the nature and preparation of novolac resins, see the book by T. S. Carswell, "Phenoplasts," 1947, page 29, et seq.

The preferred polynuclear phenol is bis(4-hydroxyphenyl)-2,2-propane, known in the trade as bisphenol-A.

In admixture with the named polynuclear phenols, use also may be made of those polynuclear phenols wherein the phenol nuclei are joined by sulfur bridges, as for example, in 4,4'-dihydroxydiphenyl sulfone.

Less preferably, there can be used 1,2-epoxy containing polyethers of aliphatic polyhydric alcohols, such as the polyglycidyl ethers thereof, as for example, the diglycidyl ethers of ethylene glycol, propylene glycol, trimethylene glycol, triethylene glycol, butylene glycol, diethyene glycol, 4,4'-dihydroxydicyclohexyl, glycerol, dipropylene glycol and the like, as well as ethers containing more than two glycidyl groups such as the glycidyl polyethers, glycerol, mannitol, sorbitol, polyallyl alcohol, polyvinyl alcohol and the like. Such glycidyl polyethers also have a 1,2-epoxy value greater than 1.0.

These epoxide resins, glycidyl polyethers as they are frequently called, may be prepared by reacting predetermined amounts of at least one polyhydric compound and one epihalohyrin in an alkaline medium.

While it is preferred to use epichlorohydrin as the epihalohydrin in the preparation of the epoxide starting materials of the present invention, other epihalohydrins such as epibromohydrin may be used advantageously.

In the preparation of these epoxide resins, aqueous alkali is employed to combine with the halogen of the epihalohydrin. The amount of alkali employed should be substantially equivalent to the amount of halogen present and, preferably, should be employed in an amount somewhat in excess thereof. Aqueous mixtures of alkali metal hydroxides, such as potassium hydroxide and lithium hydroxide, may be employed; although for economic reasons, sodium hydroxide is obviously preferred.

The product of the above described reaction instead of being a single simple compound is generally a complex mixture of glycidyl polyethers, but the principal product may be represented by the formula

wherein $n$ is an integer of the series 0, 1, 2, 3 . . . , and R represents a divalent hydrocarbon radical of a polyhydric compound and preferably a dihydric phenol. While for any single molecule $n$ is an integer, the fact that the obtained polyether is a mixture of compounds causes the determined value for $n$, e.g. from molecular weight measurement, to be an average which is not necessarily a whole number.

The glycidyl polyethers suitable for use in this invention have a 1,2-epoxy equivalency greater than 1.0. By epoxy equivalency, reference is made to the average number of 1,2-epoxy groups

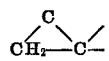

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form so that the epoxy equivalency of these compounds may be quite low and contain fractional values, and therefore the epoxy equivalency of the product is not necessarily an integer such as 2, 3, 4 and the like. The glycidyl polyether may, for example, have an equivalency of 1.5, 1.8, 2.5 and the like.

Glycidyl polyethers are disclosed in various places in the art; among the references which may be mentioned are: U.S. Pats. 2,324,483; 2,444,333; 2,494,295; 2,500,600; 2,503,726; 2,511,913; 2,518,056; 2,558,949; 2,579,698; 2,582,985; 2,592,560; 2,615,007; 2,615,008; and 2,633,458.

Many of the epoxide resins prepared by the above reaction are sold under various trade names. Data on several types are given in Table I below:

TABLE I

| Trade name and number | Epoxide, equivalent wt. | Viscosity,[1] 25° C. (Gardner-Holt) | M.P., °C., Durran mercury method |
|---|---|---|---|
| Epon 815 | 175–210 | 5–9 poises | Liquid |
| Epon 828 | 175–210 | 50–150 poises | 8–12 |
| ERL 2774 | 185–200 | 105–195 poises | 8–12 |
| Epon 834 | 225–290 | O–V | 20–28 |
| Epon 1001 | 450–525 | C–G | 64–76 |
| Epon 1004 | 870–1,025 | Q–U | 95–105 |
| Epon 1007 | 1,650–2,050 | Y–Z | 125–132 |

[1] The viscosities of Epon 815, Epon 828, and ERL 2774 are on pure resin, Epon 834 on 70% weight solution in butyl Carbitol, and all other types on 40% weight solution in buty Carbitol.

The preferred polyethers are prepared from bis(4-hydroxyphenyl)propane and contain a chain of alternating glyceryl and 2,2-bis(4-phenylene) propane radicals separated by intervening ethereal oxygen atoms and have a 1,2-epoxy equivalency between 1 and 2, an epoxide equivalent weight of about 175 to 600, preferably from about 175 to 370. A particularly suitable material for use in the invention is the normally liquid glycidyl polyether of bisphenol-A having an epoxide equivalent weight of about 175 to 220 and a 1,2-epoxy equivalency of about 1.8 to 1.95.

Another group of epoxide resins that may be used are those which are derived by the reaction of peracetic acid and unsaturated compounds. A typical member of this class is the epoxide resin derived from butadiene and crotonaldehyde which have undergone the Diels-Alder condensation and the Tischenko reaction:

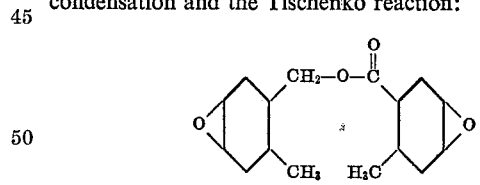

This compound is sold commercial as CP 201.

Still another group of epoxide resins are the polyepoxide polyesters which are prepared by epoxidizing the unsaturated portions of the tetrahydrophthalic residues in the polyester composition. These polyepoxide polyester compositions, as well as their preparation, are described in U.S. Pat. 2,847,394.

Another group of epoxide resins are those produced by the epoxidation of an ester of a higher fatty acid, e.g. by the reaction of an ester of a higher fatty acid with hydrogen peroxide and acetic acid in the presence of an acid cation exchange resin such as nuclear sulfonic and phenolic methylene sulfonic cation exchange resins. Such epoxide resins and their preparation are more fully described in U.S. Pat. No. 2,919,283.

The hardening of epoxide compositions of this invention may be accomplished by the addition of any of the chemical materials known in the art for curing epoxide resins. Such materials are usually referred to as curing agents but at times are designated as hardeners, activators or catalysts. While some curing agents promote curing by catalytic action; others participate directly in the reaction and are absorbed into the resin chain. Depending upon the particular agents used, the curing may be accomplished at room temperature, with heat produced by exothermic reaction or by the application of external heat. Obviously, some of these agents are more suitable than others for a particular purpose; for example, certain liquid curing agents are suitable for improving the fluidity of the compositions as well as for performing the curing or hardening function.

Numerous examples of curing agents which may be used with the compositions of this invention and which are known to those skilled in the art for curing epoxide resins are for example various amines such as aliphatic and aromatic primary, secondary and tertiary amines, e.g. diethylamine, mono-, di- and tri-butylamines, octylamine, dodecyl amine, cyclohexylamine, benzylamine, benzyl dimethyl amine, piperidine, piperazine, etc.; polyamines, e.g. m-phenylene diamine, p-phenlene diamine, 4,4'-methylenedianiline, m-xylenediamine, 4,4'-diaminodiphenyl sulfone, 4,4'-methylene dianiline-diaminodiphenyl sulfone blend, m-phenylene diaminediaminodiphenyl sulfone blends, ethylene diamine, N,N-diethylene diamine, diethylene triamine, triethylene tetramine, tetraethylenepentamine, pentaethylene diamine, etc.; oxyamines such as ethanolamine, butanolamine, diethanolamine, triethanolamine, etc.; hydroxy-alkylated polyamines, such as 2-aminoethyl-ethanolamine, N-hydroxyethyl - 1,2-diamine propane, 1,3-diaminopropanol, N-hydroxypropyl-m-phenylene diamine, N-(2-hydroxypropyl)-ethylene diamine, N, N'-bis(hydroxyethyl) triethylene triamine, N-hydroxyethyl)diethylene triamine, etc., phenolic tertiary amines, such as dimethylaminomethylphenol, tris(dimethylaminomethyl)phenol, etc.; the salts of phenolic tertiary amines, such as the 2-ethylhexanoic acid salt of tris (methylaminomethyl)phenol, etc., aliphatic amine-adducts, such as diethylene triamine, 4,4'-isopropylene diphenol adduct, diethylene triamine/acrylonitrile adduct, acrylonitrile/tetraethylene pentamine adduct, etc.; cyanamide and its polymerization products, e.g. dicyandiamide; alcoholates of polyvalent metals, such as aluminum butylate, ferric butylate, and the like; amide type curing agents, including primary carboxylic acid amides and polyfunctional carboxylic acid amides, e.g. acetamide, adipamide, benzamide, diacetamide of hexamethylene diamine, monoamides of the type described in U.S. 2,760,944, sulfonamides of the type described in U.S. 2,712,001, etc.; polyamides, e.g. the polyamide resins sold by General Mills under the Versamid trademark which may be used in such quantities that they function as flexibilizing modifiers, etc.; organic and inorganic acids and anhydrides, e.g. citric acid, acetic acid, aconitic acid, oxalic acid, succinic acid, succinic anhydride, dodecylsuccinic anhydride, lactic acid, maleic acid, maleic anhydride, fumarix acid, phthalic acid, phthalic anhydride, pyromellitic dianhydride, hexachloroendomethylene tetrahydrophthalic anhydride, hexahydrophthalicanhydride, methyl endomethylene tetrahydrophthalic anhydride, 1,2,4-butanetricarboxylic acid, isophthalic acid, terephthalic acid, acetoacetic acid, malonic acid, sulfonic acids, such as benzenesulfonic acid; phosphinic acids such as dibenzenephosphinic acid, and the like; the boron trifluoride complexes (U.S. 2,839,495) such as the p-cresol and urea complex, diethyleneaniline-boron trifluoride complex, monoethylamine-boron trifluoride complex, etc.; and metal containing organic and inorganic compounds as zinc fluoborate, potassium persulphate, nickel fluoborate, copper fluoborate, selenium fluoborate, magnesium fluoborate, tin fluoborate, potassium perchlorate, cupric sulfate, cupric phosphate, cupric phosphite, cobaltous fluoborate, cobaltous fluosilicate, chromic sulfate, chromic sulfite, lead arsenite, lead borate, lead molybdate, magnesium sulfate, cadmium arsenate, cadmium silicate, silver chlorate, silver fluosilicate, strontium chlorate, aluminum phosphate, aluminum fluoborate, ferrous silicate, manganese hypophosphite, nickel phosphate, and nickel chlorate.

The polyamine curing agents and the polycarboxylic acid anhydride curing agents are especially useful in the epoxide compositions of this invention.

A good many of the above-listed curing agents are liquids and, as mentioned above, can serve the dual role of improving the fluidity and effecting cure. Some of these which are particularly useful in such a dual role are liquid polyamines, e.g. diethylene triamine. It is often advantageous to use mixtures of different curing agents, sometimes a liquid and a solid agent or two liquid or two solid curing agents.

Effective concentrations of curing agents in the epoxy resin compositions of this invention vary in wide ranges depending on the particular epoxide and curing agent selected and the desired rate of cure. For the catalytic type curing agents the amount employed will usually vary from about 1 to about 20 parts per 100 parts by weight of the epoxide and more preferably from 1 part to 5 parts per 100 parts of the epoxide. It is generally suitable to use up to about 50 parts per 100 parts epoxide of a polycarboxylic acid or anhydride, while in the case of an amine or amide type, from about 5 to about 20 parts per 100 parts by weight of epoxide are generally used. With the cross-linking amines, the customary method is to allow one epoxy group for each active hydrogen of the amine curing agent. Since the phosphorus containing modifier of this invention acts as a partial replacement for the amine curing agent, it is preferred to use less than a stoichiometric amount. Note for example (see Example V) that with diethylene triamine it is only necessary to use 8 phr. (parts per hundred parts of epoxide resin) of the amine when 25 phr. of triphenyl phosphite is present, as contrasted with 12 phr. when no phosphite is present. Hence, one-third of a gram mole of phosphite replaces one gram mole of active hydrogen.

Various other ingredients may be mixed with the compositions of the present invention, including pigments, colors, fillers, resin stabilizers, flexibilizing modifiers and the like. The following examples serve solely to illustrate typical embodiments of this invention and are not intended to limit the scope of the invention except to the extent specifically stated, and except to the extent that the appended claims are limited.

EXAMPLES I–III

Experiments indicate that the early formation of gel in a TPP-epoxy premix is a result of the presence of hydrolyzed triphenyl phosphite. The amine overcomes the hydrolysis problem with its associated gel formation during storage. There are three distinct advantages which our system has over the currently used MgO system.

(1) The amino is completely soluble in TPP while the MgO precipitates out during storage.

(2) The amino can be added to the TPP prior to shipment. This precludes hydrolysis due to poor handling at the customers site.

(3) The amino gives better stability against hydrolysis of TPP than MgO in a 50% relative humidity.

EXAMPLE I

Under controlled conditions, a series of compounds were evaluated for stabilizing action against hydrolysis of triphenyl phosphite. Observations were made of the degree of hydrolysis that had occurred at room temperature—as reflected by the amount of phenol produced by hydrolysis of the triphenyl phosphite.

The room temperature hydrolysis study was run in 50% relative humidity with daily sampling. After 3 days, the sample stabilized with 0.5% triisopropanol amine showed only 1.5% phenol while both unstabilized TPP and TPP with 0.5% MgO contained about 30% phenol. However, the MgO stabilized sample had reached only 5% after 1 day while the unstabilized TPP had reached about 12%. The sharp rise in hydrolysis of MgO stabilized material was attributed to gradual precipitation of the stabilizer. A check was made with daily agitation of MgO stabilized TPP and resulted in better stabilization, but it still showed about 16% phenol after 3 days. The results are illustrated in Table II, in terms of percent of phenol present, on a weight basis.

TABLE II

| Compound evaluated | Percent phenol present after— | | |
|---|---|---|---|
| | 24 hrs. | 48 hrs. | 72 hrs. |
| Compound 1: | | | |
| (a) Diisopropanol amine | 1.7 | 1.7 | 1.9 |
| (b) Aniline | .83 | .87 | 1.1 |
| (c) Diethanol amine | 2.7 | 2.4 | 2.5 |
| (d) Control (blank) | 18 | 30 | 37 |
| Compound 2: | | | |
| (a) Dimethyl aniline | | 1.8 | 4.2 |
| (b) Ayridine | | 1.8 | 3.0 |
| (c) Triethyl amine | | 1.7 | 3.7 |
| (d) Triethanol amine | | 4.4 | 5.5 |
| (e) $NH_3$ | | 2.8 | 3.9 |
| (f) Dimethyl amine | | 2.9 | 6.3 |
| (g) Control (blank) | | 9.6 | 31 |
| Compound 3: | | | |
| (a) Triisopropanol amine | | | 1.5 |
| (b) MgO | 5 | | 30 |
| (c) Control (blank) | 12 | | 30 |
| Compound 4: | | | |
| (a) Guanidine | .55 | | 7.5 |
| (b) Monoethanol amine | .92 | | 20 |
| (c) Tetra isopropanol ethylene diamine | .49 | | .69 |
| (d) Metaphenylene diamine | .50 | | .92 |

EXAMPLE II

Several series of test tube cures were run with (a) fresh TPP, (b) 4 hour hydrolyzed TPP, (c) MgO stabilized TPP and (d) triisopropanol amine stabilized TPP. Although there were slight variations noted in the peak exotherm temperature from run to run, there is not a significant difference between the cure temperatures obtained using fresh TPP, TPP+0.5% MgO or TPP+0.5% triisopropanol amine. However, in all cases the hydrolyzed TPP gave a lower exotherm during cure. A check was made to see if addition of MgO to hydrolyzed TPP prior to cure had any effect on cure temperature or appearance. The test gave the same cures and colors as had been observed for the 4 hour hydrolyzed TPP alone.

EXAMPLE III

Castings were made using the following formulation:

100 parts Epon 828 (a commercial epoxy)
8 parts diethylene triamine
25 parts triphenyl phosphite
0.125 part additive Fresh TPP, TPP with MgO and TPP with triisopropanol amine were incorporated into the castings for comparison. A check of Barcol Hardness after a 24 hour room temperature cure showed no difference between samples (30–31). A second hardness check after a 100° C. post cure also showed essentially no difference (46–49). Both the room temperature cured and post cured castings were subjected to 120° F. water for 1 week. This test also showed very little difference between the castings with the room temperature cures showing 2.2–2.3% wt. gain and the 100° post cures showing 1.0–1.1% wt. gain.

Two different commercial epoxy resins A and B (i.e., diglycidal ethers of a bisphenol made from acetone, known as Epon 815 and 828) were used to prepare premixes of the following formulation:

100 parts epoxy resin
25 parts triphenyl phosphite
0.125 part additive
20 parts humidified silica (0.11% $H_2O$)

The premixes were then aged in open mouth jars until gel formation was observed. Results are illustrated in Table III.

TABLE III

| | Hours to gel | |
|---|---|---|
| | Epoxy resin A (Epon 815) | Epoxy resin B (Epon 878) |
| 1. Accelerated test at 120° F.: | | |
| (1) Hydrolyzed TPP (4 hours in 50% relative humidity) [control] | 3½ | 3½ |
| (2) Fresh TPP | 135 | 135 |
| (3) Fresh TPP plus 0.5% MgO | 135 | 135 |
| (4) Fresh TPP plus 0.5% triisopropanol amine | 198 | 179 |
| 2. Room temperature test: | | |
| (1) Hydrolyzed TPP (4 hrs. in 50% relative humidity) [control] | 10 | 10 |
| (2) Fresh TPP | 984 | 816 |
| (3) Fresh TPP plus 0.5% MgO | 984 | 840 |
| (4) Fresh TPP plus 0.5% triisopropanol amine | 1,824 | 2,56 |

EXAMPLES IV THROUGH VI

Following the general procedure described in Example I, the following phosphites were subjected to a 50% relative humidity at room temperature, and evaluated in terms of the percent of phenol (Phen.) or decanol (dec.) present (as produced by hydrolysis) on a weight basis as illustrated in Table IV.

TABLE IV

| Compound evaluated | Percent phenol or decanol present after— | | |
|---|---|---|---|
| | 24 hrs. | 48 hrs. | 72 hrs. |
| Compound IV: | | | |
| (Control) Phenyl neopentyl phosphite (PNP) | 1.0% phenol | 1.3% phenol | |
| PNP plus 0.5% triisopropanol amine (TA) | 0.2% phenol | 0.2% phenol | 0.2% phenol |
| Compound V: | | | |
| (Control) Tridecyl phosphite (TP) | 1.2% decanol | 1.4% decanol | 1.6% decanol |
| TP plus 0.5% TA | 1.1% decanol | 1.1% decanol | 1.1% decanol |
| Compound VI: | | | |
| (Control) Diphenyldecyl phosphite (DDP) | 0.7% phenol and 0.6 decanol | 0.9% phenol and 0.7% decanol | 1.7% phenol and 0.8% decanol |
| DDP plus 0.5% TA | 0.7% phenol and 0.5% decanol | 0.6% phenol and 0.4% decanol | 0.7% phenol and 0.5% decanol |

Equivalents and modifications obvious to the skilled artisan from the above disclosure are within the scope of this invention and the invention is limited solely to the extent expressly stated, as limited by the appended claims.

We claim:

1. An epoxy composition comprising an epoxy resin having at least one 1,2-epoxy group and a neutral phosphite ester composition stable against hydrolysis comprising a neutral phosphite ester present in the proportion of from about 5 to about 40 parts by weight per 100 parts by weight of epoxy resin and a nitrogen-containing stabilizing agent present in a stabilizing amount up to about 5% by weight of said phosphite ester.

2. A composition according to claim 1, in which said stabilizing agent comprises substantially triisopropanol amine and said phosphate ester comprises substantially triphenyl phosphite.

3. A composition according to claim 1 wherein said nitrogen-containing stabilizing agent is selected from the group consisting of:

(1) a 5 or 6 membered heterocyclic amine;
(2) a di- or tri-lower alkanol amine;
(3) bis(di lower alkylamino) lower alkylene;
(4) ammonia;
(5) di- or tri-lower alkyl amine;
(6) amino substituted benzene;
(7) di-lower alkyl amino substituted benzene;
(8) guanidine; and
(9) quinoline or anthraquinoline.

4. An improved epoxide composition suitable for use in forming cured resinous products comprising a glycidyl polyether of bis(4 - hydroxyphenyl) - 2,2-propane, having an epoxide equivalent weight of from about 175 to about 370, an aliphatic polyamine curing agent, from about 5 to about 40 parts by weight per 100 parts by weight of glycidyl polyether of a neutral phosphite ester of the structure:

wherein $R_1$, $R_2$ and $R_3$ are aryl hydrocarbon radicals having from 6 to 15 carbon atoms and a nitrogen-containing compound present in a stabilizing amount up to about 5% by weight of said neutral phosphite ester selected from the group consisting of:

(1) an heterocyclic alkyl selected from the group consisting of piperidine, pyrrolidine, piperazine, diketopiperazine, diketopiperazine, pipecoline, anthraquinoline, thiazole, oxazolidine, isoxazolidine, and oxdiazole,
(2) an aromatic heterocyclic selected from the group consisting of oxazoline, isoxazoline, thiotriazole, pyridine, picoline, pyrrole, and quinoline,
(3) a dialkanol amine selected from the group consisting of diisopropanol amine, diethanol amine, tetraethanol ethylene diamine, and tetraisopropanol ethylene diamine,
(4) a trialkanol amine selected from the group consisting of triisopropanol amine, and triethanol amine, and
(5) an alkyl amine selected from the group consisting of triethyl amine, diethyl amine, and tripropyl amine.

5. A composition according to claim 4, in which said stabilizing agent comprises substantially triisopropanol amine and said phosphite ester comprises substantially triphenyl phosphite.

6. The composition of claim 1 wherein the phosphite stabilizer is a 5 or 6 membered heterocyclic amine.

7. The composition of claim 1, wherein the phosphite stabilizer is a di- or tri-lower alkanol amine.

8. The composition of claim 1, wherein the phosphite stabilizer is bis(dilower alkyl amino) lower alkylene.

9. The composition of claim 1, wherein the phosphite stabilizer is di- or tri-lower alkyl amine.

10. The composition of claim 1, wherein the phosphite stabilizer is aniline.

11. The composition of claim 1, wherein the phosphite stabilizer is dilower alkyl aniline.

References Cited
UNITED STATES PATENTS

| | | | |
|---|---|---|---|
| 3,009,939 | 11/1961 | Friedman | 260—47 |
| 3,240,751 | 3/1966 | Cannon et al. | 260—47 |
| 3,313,941 | 4/1967 | Velzmann et al. | 260—88.3 A |

FOREIGN PATENTS

| | | | |
|---|---|---|---|
| 1,232,646 | 10/1960 | France | 260—47 |

WILLIAM H. SHORT, Primary Examiner

T. E. PERTILLA, Assistant Examiner

U.S. Cl. X.R.

260—2 EC, 2 Ep, 18 Ep, 45.9 R, 47 Ep, 59, 91.3 VA

UNITED STATES PATENT OFFICE
CERTIFICATE OF CORRECTION

Patent No. 3,703,496     Dated November 21, 1972

Inventor(s) James J. Hodan et al.

It is certified that error appears in the above-identified patent and that said Letters Patent are hereby corrected as shown below:

Column 1, lines 24-51, delete. Column 2, line 53, "diamethyl" should read -- dimethyl --; Column 5, line 55, the formula should read

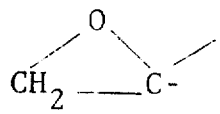

Column 6, line 17, "buty" should read -- butyl --; line 53, "commercial as CP 201" should read -- commercially as EP 201 --. Column 7, line 17, "phenlene" should read -- phenylene --; line 26, "-1,2-diamine" should read -- -1,2-diamino --. Column 8, line 50, "amino" should read -- amine --; line 52, "amino" should read -- amine --; line 55, "amino" should read -- amine --. Column 9, line 13, "Ayridine" should read -- Pyridine --. Column 10, line 29, under heading "Epoxy resin B (Epon 878)" "2,56" should read -- 2,568 --. Column 11, line 33, delete "diketopiperazine,". Column 10, line 74, "phosphate" should read -- phosphite --.

Signed and sealed this 17th day of September 1974.

(SEAL)
Attest:

McCOY M. GIBSON JR.            C. MARSHALL DANN
Attesting Officer              Commissioner of Patents